March 9, 1954
L. L. BURNS, JR
2,671,275
MAGNETOMETER
Filed March 31, 1949
2 Sheets-Sheet 1
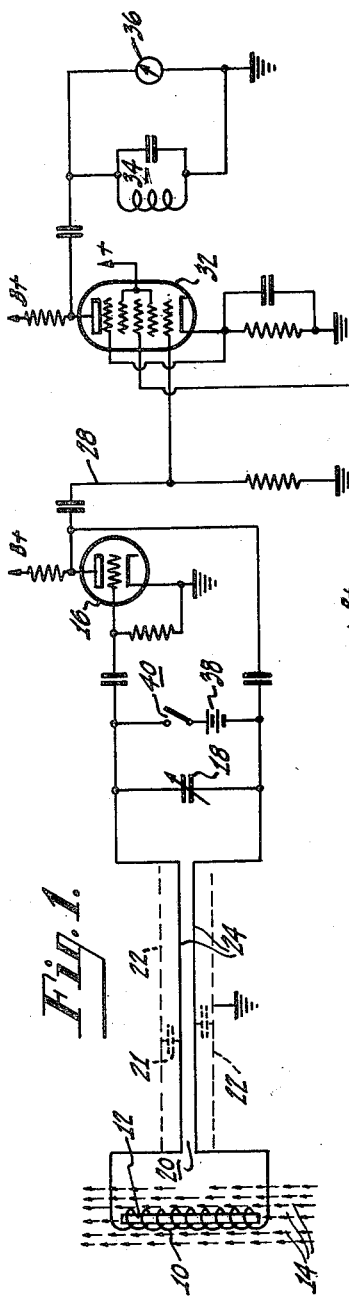
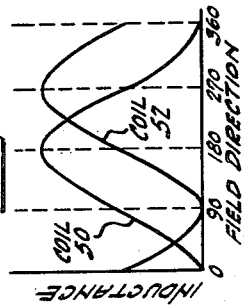
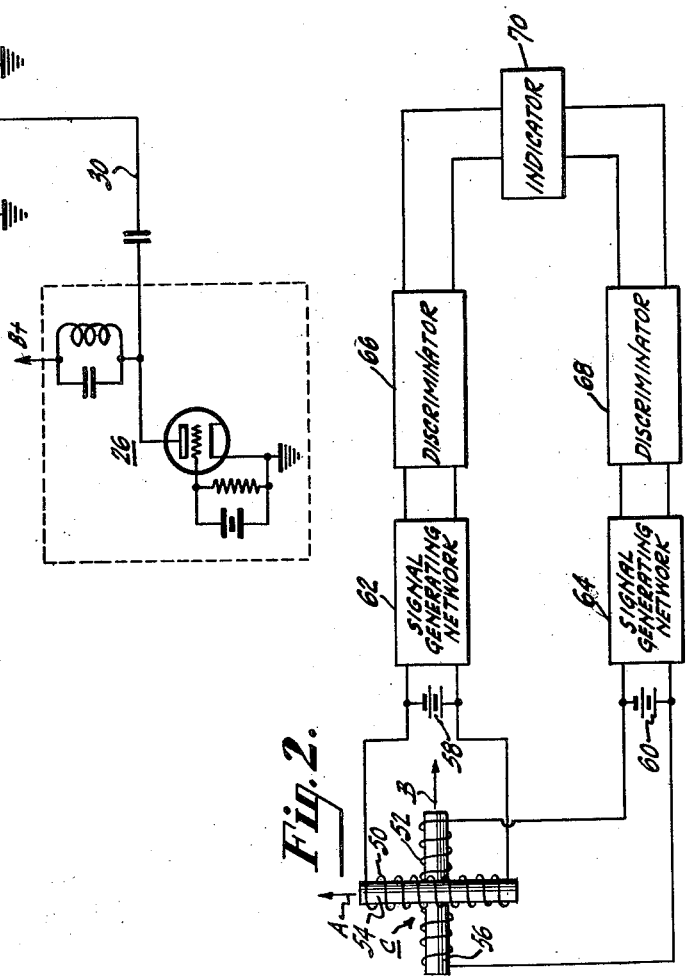
INVENTOR
LESLIE L. BURNS, JR.
BY
ATTORNEY

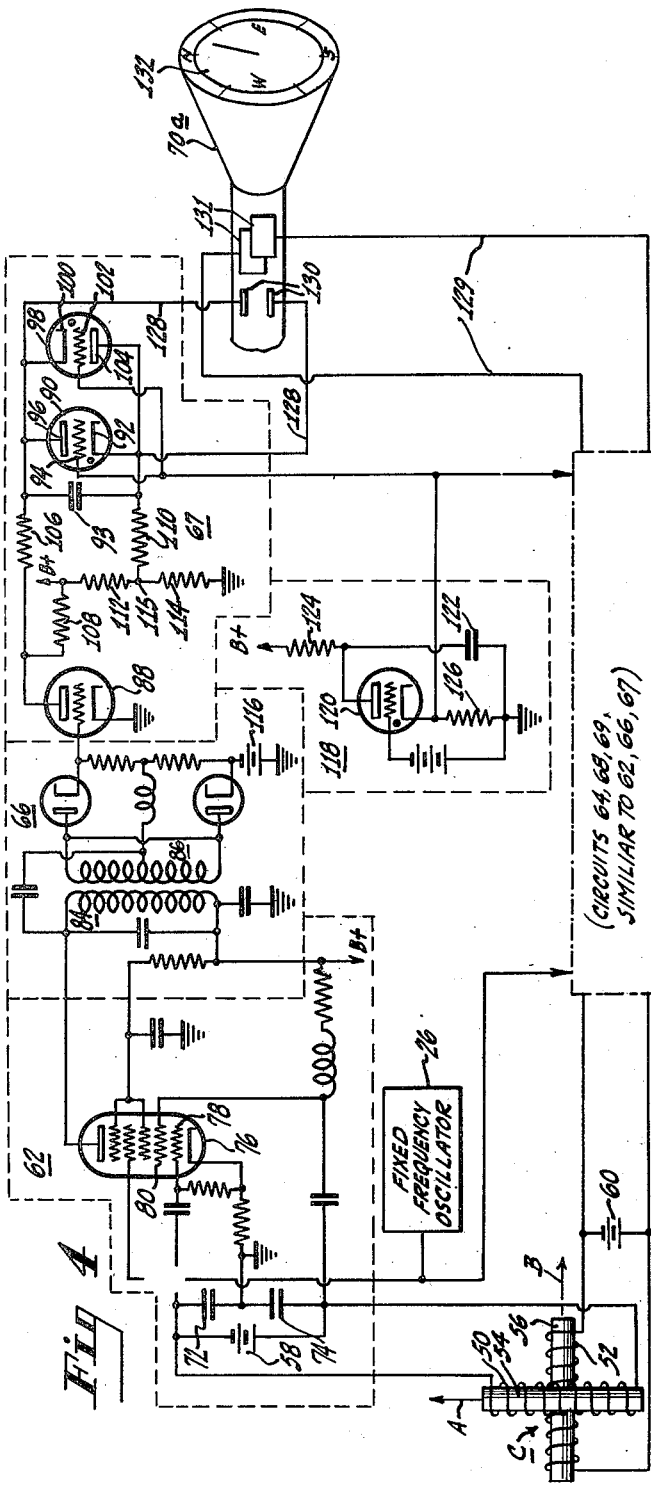
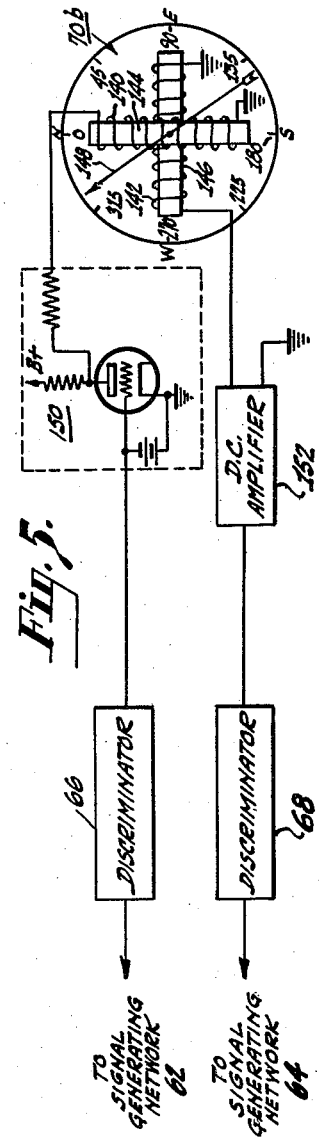

Patented Mar. 9, 1954

2,671,275

UNITED STATES PATENT OFFICE 2,671,275

MAGNETOMETER

Leslie L. Burns, Jr., Princeton, N. J., assignor to Radio Corporation of America, a corporation of Delaware Application March 31, 1949, Serial No. 84,621

2 Claims. (Cl. 33—204)

My invention relates to improvements in apparatus for measuring magnetic fields, and particularly to apparatus for measuring the field strength, or the direction, or both, of a magnetic field. For simplicity, an apparatus of this kind will be referred to herein and in the appended claims as a magnetometer.

Magnetometers have been proposed which depend for their operation on the motive effect of a magnetic field on a current-carrying conductor (see e. g. U. S. P. 1,863,415), on the reaction between a current-carrying conductor and the field to be measured (see e. g. U. S. P. 1,886,336), or on a measurement of the current required to saturate a permeable core located in the field to be measured (see e. g. U. S. P. 2,047,609). These and other comparable types of magnetometers either require accurately mounted moving parts or involve complicated apparatus with a plurality of coil structures and the like.

It is a principal object of my invention to provide an improved magnetometer which does not depend for its operation on relative motion between the parts thereof, and which is characterized by extreme simplicity and sensitivity.

Another object of my invention is to provide an improved apparatus for measuring and indicating the relative direction of the earth's magnetic field.

In accordance with my invention, the foregoing and other objects and advantages are attained by locating a core member of variable permeability (defined hereinafter) in the magnetic circuit of an inductor, in inductance-affecting proximity thereto, and measuring the effect produced on the inductance of the inductor by permeability changes occurring in the core member when the latter is placed in the field to be measured. For simplicity, the term "core member" is used herein and in the appended claims to mean a magnetically permeable member located in inductance-affecting proximity to an inductor, and is intended to include the case of a permeable member surrounded by an inductor, or a permeable member in the form of a sleeve surrounding an inductor, as well as other comparable arrangements wherein an appreciable portion of the flux linkages forming the magnetic field of an inductor will pass through the permeable member so that the effective inductance of the inductor will be a function of the permeability of the core member. The permeability of a core member will be understood to mean the readiness with which the core will accept magnetic flux, or, more precisely, the ratio between the amount of magnetic flux passing through the core and the magnetizing force producing the flux. Where a material is referred to herein and in the appended claims as having "variable permeability," it is intended to mean that the magnetic permeability of material so referred to varies as a function of the magnetic flux density therein.

A more complete understanding of my invention can be had by reference to the following description of illustrative embodiments thereof, when considered in connection with the accompanying drawings, wherein:

Fig. 1 is a schematic diagram of a magnetometer arranged in accordance with my invention;

Fig. 2 is a block diagram of a magnetic compass embodying the principles of my invention;

Fig. 3 is a graph illustrating one of the operational characteristics of the apparatus illustrated in Fig. 2;

Fig. 4 is a schematic diagram containing specific illustrative circuits corresponding to the blocks in Fig. 2; and Fig. 5 shows a modified form of indicator suitable for use in the apparatus of Fig. 2.

Referring to Fig. 1 of the drawing, illustrating one embodiment of my invention, there is shown an inductor in the form of a coil 10, wound on a variably permeable core member 12, together with apparatus for measuring the inductance of the coil 10. The core member 12 preferably consists of so-called ferrite material (i. e. a homogeneous crystalline compound comprising the reaction product of iron oxide and at least one other metallic oxide), although other materials can also be used which possess the property of variable permeability, as that term has previously been defined herein.

When the coil 10 and the core 12 are placed in a magnetic field 14, the flux in the field 14 will pass through the core 12, causing a decrease in the permeability thereof. Since the inductance of an inductor varies directly as the permeability of the magnetic circuit path for the inductor (i. e. the path that will be followed by a magnetic field generated by current flow through the inductor), any increase or decrease in the permeability of the core 12 will result in a corresponding increase or decrease, respectively, in the effective inductance of the coil 10. Accordingly, the effective inductance of the coil 10 will be decreased by the magnetic flux in the core 12 due to the field 14, and measurements of the inductance of the coil 10 can be utilized as measurements of the field 14.

While any desired method can be used for measuring the inductance of the coil 10, a preferred method is to connect the coil to a signal generating network to control the frequency of the signals generated therein, and to measure the frequency of the signals generated in the network as a measure of the inductance of the coil.

In the apparatus shown in Fig. 1, the coil 10 is connected in circuit with a triode tube 16 through a shielded cable 20. The cable 20 allows the coil 10 and the core 12 to be moved about at will in measuring magnetic fields, while the stray capacitance 21 between the shield 22 of the cable 20 and the shielded leads 24 is effectively in parallel with the coil 10, thereby forming the resonant circuit of a so-called Colpitts oscillator. A variable capacitor 18 is connected in parallel with the resonant circuit of the oscillator to permit frequency adjustment for calibration purposes and the like.

In order to measure the frequency of the signals from the oscillator tube 16 accurately, it is deemed preferable to mix the signals from the oscillator tube 16 with those from a stable, fixed frequency oscillator, such as a crystal oscillator 26, and to measure the difference in frequency between the two signals. To this end, the output lead 28 from the oscillator tube 16, and the output lead 30 from the crystal oscillator 26, are connected to a pentagrid mixer tube 32, wherein the two input signals are combined to obtain sum and difference frequency components in the output from the mixer 32. A filter circuit 34 serves to eliminate all components of the signals from the mixer 32 except those corresponding to the difference in frequency between the two input signals, and a frequency meter 36 is provided for measuring the frequency of the desired difference-frequency component. The meter 36 can be calibrated in terms of magnetic field strength, or in any convenient units for the particular use involved.

If it is desired to determine the direction of a magnetic field with the apparatus of Fig. 1, a small unidirectional field in the core member 12 can be used to provide directional "sensing". For example, a battery 38 can be connected in parallel with the coil 10 through a switch 40 in order to pass a small D. C. current through the coil 10. The current through the coil 10 will establish a small, constant magnetic field through the core 12, so that when the core 12 is aligned with the field being measured, the field due to the current from the battery 38 will either add to or subtract from the field being measured (depending on whether the two fields are running in the same or opposite directions), thereby increasing or decreasing the frequency of the signals from the oscillator tube 16. The exact direction and strength of the unknown field can be ascertained by manipulating the coil 10 and the core 12 while observing the indications of the meter 36.

A magnetometer of the type shown in Fig. 1 is especially useful as a laboratory instrument, as it has been found that magnetic fields of the order of .025 gauss can be measured readily with an instrument of the foregoing type. The principles of my invention find further application in apparatus for measuring the earth's magnetic field, or a so-called magnetic compass, and in Fig. 2 of the drawing there is shown, in block diagram form, a magnetic compass arranged in accordance with the invention.

In the apparatus of Fig. 2, two inductance coils 50, 52 are located at right angles to each other, and provided with core members 54, 56 of variable permeability. Two batteries 58, 60 are provided for supplying a small current to the two coils 50, 52, in order to establish a small magnetic field through the cores 54, 56. For convenience of discussion, the fields due to the currents from the batteries 58, 60 are assumed to be in the direction of the arrows A, B, respectively. Taken together, the two coil-and-core members 50, 54, and 52, 56, comprise a composite coil-and-core structure C. For convenience, the directions indicated by the arrows A and B will be referred to herein as the primary and secondary directional axis of the structure C, respectively, although it will be appreciated that the two axes A, B, have no inherent features of distinction other than the arbitrary designations assigned to each.

Assuming that the structure C is located in the earth's magnetic field, with the primary directional axis A parallel to, and in the same direction as, the lines of the earth's field, then the flux in the earth's field will add to the flux due to the current from the battery 50, the magnetic flux density in the core 54 will be at a maximum, and the effective inductance of the coil 50 will be at a minimum, in accordance with the relations between inductance, permeability, and flux density previously mentioned. At the same time, the earth's field will be at right angles to the secondary directional axis B, and will neither add to nor oppose the constant field through the core 56 due to current from the battery 60. Consequently, the effective inductance of the coil 52 will have some value intermediate between a maximum and a minimum value. Assuming, next, that the structure C is rotated in a counter-clockwise direction (in the plane of the earth's magnetic field), the flux density in the core 54 will decrease during the first 180 degrees of rotation of the structure C, and will increase during the second 180 degrees of rotation. At the same time, the flux density in the core 56 will increase during the first and last 90 degrees of rotation of the structure C, and will decrease during the intermediate 180 degrees of rotation. Consequently, the effective inductance of the coil 50 will increase to a maximum, and then decrease to a minimum, during the rotation of the structure C, while the effective inductance of the coil 52 will first decrease, then increase, and then decrease again to its original intermediate value at the end of 360 degrees of rotation.

The foregoing changes in the effective inductance of the coils 50, 52 (during 360 degrees of rotation of the coil-and-core structure C) are diagrammed in Fig. 3, wherein the effective inductance of the coils 50, 52 is plotted as the ordinate against direction of the earth's field as the abscissa. From Fig. 3 it will be clear that for each of the possible angular relations between the primary axis A in Fig. 2 and the earth's magnetic field, there is a corresponding pair of inductance values for the coils 50, 52, and that no two positions of the structure C will give the same combination of values of inductance for the coils 50, 52. Accordingly, a concurrent indication of the effective inductances of the coils 50, 52 will also be an indication of the direction of the earth's field with respect to the directional axes A, B of the core-and-coil structure C.

One arrangement of apparatus for obtaining an indication of the relative inductances of the coils 50, 52 is shown in block diagram form in Fig. 2, and specific circuits and indicators, illustrative of apparatus corresponding to the blocks in Fig. 2, are shown in Figs. 4 and 5.

In the block diagram of Fig. 2, each of the coils, 50 and 52, is connected to a signal generating network, 62 and 64, respectively. The frequency of the signals generated in the networks 62 and 64 is controlled by the effective inductance of the coils 50 and 52, respectively. The signals from each of the networks 62, 64 are supplied to frequency discriminator networks 66, 68, each of which will generate a voltage representative in polarity and magnitude of the frequency of the signals supplied thereto. Both of the discriminators 66, 68 are connected to an indicator 70 which will provide a composite measurement and indication of the relative polarity and magnitude of the voltages from the discriminators 66, 68, and, hence, of the frequency of the signals from the signal generating networks 62, 64. Since the frequency of the signals from the networks 62, 64 will be a function of the direction of the earth's magnetic field relative to the directional axes A, B of the coil-and-core structure C, the indication produced on the indicator 70 will be a frequency measurement representative of the direction of the earth's field. In Fig. 4 there are shown specific circuits illustrative of those indicated by blocks in Fig. 2. For simplicity, the circuits for only one of the coils, 50, are shown in Fig. 4, it being understood that a similar group of circuits is indicated by the dot-and-dash outline associated with the coil 52.

In Fig. 4, the coil 50 is connected to a signal generating network 62 which includes a pentagrid tube 76. Two of the grids, 78 and 80, in the tube 76 serve as the control grid and "anode," respectively, in a Colpitts oscillator network, the resonant circuit for which comprises the coil 50 and two capacitors 72, 74. The tube 76 serves both as an oscillator tube (in conjunction with the circuit elements 50, 72, 74), and as a mixer tube, wherein the signals generated in the oscillator portion of the tube 76 are mixed with signals of higher frequency from a fixed frequency signal generator 26, similar to the network 26 in Fig. 1. The output of the tube 76 is connected to a discriminator network 66, of a type well known in the art. The resonant circuits 84, 86 in the discriminator 66 are both tuned to a frequency (hereinafter referred to as the "center" frequency for the discriminator) corresponding to the difference between the frequency of the signals from the fixed oscillator 26 and the frequency of the signals which will be generated in the oscillator section of the tube 76 when the primary axis of the structure C is at right angles to the earth's magnetic field. The discriminator network 66 will generate no output voltage when the difference frequency of the signals from the tube 76 is equal to the center frequency of the discriminator, and will generate a positive or a negative voltage when the difference frequency of the signals from the tube 76 is above or below the center frequency. Thus, for example, if the primary axis A is aligned with the earth's field, with the latter adding to the fixed field due to the battery 58, the frequency of the signals generated in the oscillator section of the tube 76 will be a minimum, the difference frequency will be a maximum, and the output voltage from the discriminator network 66 will have a maximum positive value. If the earth's field and the primary axis A are aligned but extend in opposite directions, the discriminator output will be a maximum negative voltage. Intermediate angular relations between the primary axis A and the earth's field will produce intermediate voltage outputs from the discriminator 66.

It should be noted that the signal generating network 62 in Fig. 4 could comprise merely an oscillator corresponding to the oscillator portion of the tube 76, without the fixed frequency oscillator 26, and without the remaining portion of the tube 76. However, it is preferable to tune the oscillator which is directly controlled by the coil 50 to the highest suitable frequency which is convenient, in order to obtain the maximum possible frequency change with changes in effective inductances of the coil 50. On the other hand, the discriminator network 66 will be more sensitive to small frequency changes about a low center frequency, and it is, therefore, deemed preferable to mix the signal from the oscillator section of the tube 76 with a fixed frequency signal to obtain a relatively low frequency resultant, say of the order of 500 kilocycles.

The output of the discriminator network 66 is connected to the grid of a D. C. amplifier tube 88 in an indicator control network 67, which supplies one set of deflection voltages to a cathode ray tube indicator 70a. The control network 67 includes a "sawtooth" signal generator, which consists of two gas triode tubes 90, 98, connected in parallel with a capacitor 93, and resistors 106—114. The anode 96 of one gas tube 90 and the cathode 100 of the other gas tube 98 are connected to the voltage supply source (not shown) through two of the resistors, 106, 108, one of which (108) serves as the anode load resistor for the D. C. amplifier tube 88. The cathode 92 of one gas tube 90 and the anode 104 of the other gas tube 98 are connected to the voltage supply source through the resistor 110 and through one of the resistors 112 in a voltage divider 112, 114. A biasing voltage source 116 is provided for the D. C. amplifier 88, and the magnitude of the voltage from the bias source 116 and the resistance of the resistors 106—114 are so selected that the voltage at the anode of the D. C. amplifier 88 will be equal to the voltage at the junction point 115 of the resistors 110 and 112 when the output of the discriminator 66 is zero (i. e. when the difference frequency of the signals from the tube 76 corresponds to the center frequency for the discriminator 66). If the difference frequency of the signals from the tube 76 in the signal generator 62 is above the center frequency, the discriminator will supply a positive voltage to the amplifier 88, causing the voltage at the anode of the amplifier to become less positive than the voltage at the junction 115 of the resistors 110, 112. A decrease in the difference frequency of the signals from the tube 76 will have the opposite effect, causing the voltage at the anode of the amplifier tube 88 to become more positive than the voltage at the junction 115 of the resistors 110, 112.

The grids 94, 102 of the gas tubes 92, 98 are both connected to a "trigger pulse" generator 118, consisting of a gas triode 120, a capacitor 122 connected in parallel therewith, a charging resistor 124, and a cathode resistor 126 for the tube 120. The capacitor 122 in the trigger generator 118 will alternately charge through the resistor 124 and discharge through the gas tube 120 and the cathode resistor 126, at a constant repetition rate, generating positive pulses of voltages across the resistor 126, and, hence, at the grids 94, 102 of the gas tubes 90, 98.

In the control network 67, if the difference frequency of the signal from the tube 76 in the signal generating network 62 is above the center frequency of the discriminator, so that the voltage at the anode of the tube 88 is more positive than the voltage at the junction 115 of the resistors 110, 112, then charging current will flow to the capacitor 93 through the resistor 106, and the capacitor 93 will discharge through the gas tube 92 on the occurrence of each pulse from the trigger pulse generator 118, thus generating a "negative" sawtooth wave at the anode 96 of the tube 90, and a "positive" sawtooth wave at the cathode 92 of the tube 90. If the difference frequency of the signals from the tube 76 is below the center frequency of the discriminator 66, the polarity of the voltages at the anode of the tube 88 and at the junction 115 of the resistors 110, 112 will reverse, bringing the other gas tube 98 into operation, and causing the capacitor 93 to charge in the opposite direction, thus reversing the polarity of the sawtooth waves on the output leads 128 from the indicator control network 67.

The leads 128 from the control network 67 are connected to one of the sets of deflecting plates 130 of the cathode ray tube indicator 70a, while corresponding leads 129 from the control network 69 (associated with the coil 52) are connected to the other set of deflecting plates 131 in the cathode ray tube 70a.

Assuming that the cathode ray beam in the tube 70a is initially centered on the screen 132, the sawtooth voltage waves from the network 67 will repeatedly tend to deflect the beam either upwardly or downwardly from the center of the screen, a greater or less amount, depending on the polarities and magnitudes of the sawtooth waves from the network 67 as determined by the angular relation between the primary axis A of the structure C and the earth's magnetic field. At the same time, the sawtooth voltage waves from the control network 69 will repeatedly tend to deflect the cathode ray beam a greater or less distance to the right or to the left of the center of the screen 132, depending on the angular relation between the secondary axis B and the earth's magnetic field. As a result, the cathode ray beam will be deflected repeatedly along a line determined by the vector sum of the sawtooth voltages from the control networks 67, 69.

The screen 132 of the cathode ray tube 70a is provided with a peripheral scale corresponding to the points of the compass, and the tube is oriented so that when the primary axis A of the structure C is aligned in the same direction as the earth's magnetic field, the line traced by the cathode ray beam on the screen 132 will point toward zero degrees (north) on the peripheral scale.

The coil-and-core structure C can be permanently mounted in an airplane, boat, or the like, and the mounting means may include gimbals or similar means to insure that the plane of the coil-and-core structure C will remain parallel with the plane of the earth's field regardless of the attitude assumed by the craft in which the apparatus is mounted. Such structural details are not shown since they are well known in the art and form no part of the present invention per se.

In Fig. 5 there is shown an alternative form of indicator 70b suitable for use in an apparatus of the type shown in Fig. 2.

The indicator 70b shown in Fig. 5 is an electro-magnetic device comprising a pair of coils 140, 142, mounted at right angles to each other, and having core members 144, 146 associated therewith. The core members 144, 146 are preferably of substantially unvarying permeability so that the indicator 70b will be relatively unaffected by extraneous magnetic fields which may pass through the cores 144, 146. The indicator 70b also includes a magnetized needle 148 which is pivotally mounted at the intersection of the crossed coils 140, 142, so as to be subject to the combined effect of magnetic fields generated by current in the coils 140, 142.

The coils 140, 142 are supplied with unidirectional currents from two D. C. amplifiers 150, 152, only one of which is shown in detail. The D. C. amplifiers 150, 152 each receive control voltages from two discriminators 66, 68, and the discriminators 66, 68 are each connected to signal generating networks (not shown), as in the apparatus of Figs. 2 and 4. Accordingly, the output voltage from each of the D. C. amplifiers 150, 152 will be a function of the frequency of the signals from the signal generating networks (not shown), which, in turn will have their frequency controlled by the relative orientation of the earth's field and the core-and-coil structure C as in Fig. 4. The magnitude of the current through the indicator coils 140, 142 in Fig. 5 will be dependent on the frequency of the signals received by the discriminators 66, 68, and the vector sum of the magnetic fields of the coils 140, 142 will determine the relative position of the indicating needle 148. In view of the explanation already given of the operation of the apparatus of Fig. 4, it is believed that a detailed discussion of the operation of the apparatus shown in Fig. 5 is unnecessary.

Since the apparatus illustrated in Figs. 2, 4, and 5 involve signals which are suitable for radio transmission, it is apparent that a magnetic compass embodying my invention is suitable for telemetering applications, as well as for self-contained instruments. For example, the coil-and-core structure C and the signal generating networks 62, 64 of Fig. 2 could be placed in a pilotless aircraft, together with a radio transmitter, while the remaining portion of the apparatus could be connected to a radio receiver located at the base for the aircraft, and a continuous indication of the aircraft bearing conveniently obtained. Similarly, the coil-and-core structure C and signal generating networks 62, 64 could be placed in a non-magnetic buoy located in the entrance of a harbor, and the indicator 70 located on shore, with a radio link connecting the two, so that any distortion of the earth's field due to ships or submarines entering the harbor would be indicated immediately at the shore stations.

Since these and other modifications could be made in the apparatus shown and described, all within the scope and spirit of the invention, the foregoing is to be construed as illustrative, and not in a limiting sense.

What is claimed is:

1. A magnetometer comprising, in combination, a pair of variably permeable members fixed at right angles to each other, a pair of inductance coils wound one on each of said core members, signal generating networks coupled to each of said coils for generating signals at frequencies which are functions of the effective inductances of said coils, magnetic-flux-producing means for establishing a constant unidirectional magnetic flux in each of said core members, and means for measuring and indicating concurrently the direction of the vector sum of said effective inductances as a function of the frequencies of the signals generated in each of said signal generating networks, said measuring and indicating means comprising a discriminator network coupled to each of said signal generating networks for producing D. C. voltages of relative magnitudes and polarities determined by the frequencies generated in said signal generating networks, and an indicator coupled to said discriminator networks for producing a composite indication of the voltages produced by said discriminator networks, said flux-producing means comprising a source of direct current connected to each of said coils for establishing magnetic-field-producing currents in said coils.

2. A magnetometer comprising, in combination, a pair of variably permeable members fixed at right angles to each other, a pair of inductance coils wound one on each of said core members, signal generating networks coupled to each of said coils for generating signals at frequencies which are functions of the effective inductances of said coils, magnetic flux-producing means for establishing a constant unidirectional magnetic flux in each of said core members, discriminator networks coupled to each of said signal generating networks for producing D. C. voltages of relative magnitudes and polarities determined by the frequencies of the signals generated in said signal generating networks, a cathode ray tube indicator, and means coupling said cathode ray tube to said discriminators for deflecting the cathode ray beam in said tube in accordance with the voltages produced by said discriminator networks, said last-mentioned means comprising a pair of similar circuits each having a separate amplifier associated with each discriminator network, said amplifiers having at least a cathode, a grid, and an anode, means to apply said D. C. voltages of its associated discriminator network to said grid, a load resistor and a voltage divider in the anode cathode circuit of said amplifier, a pair of thyratrons each having at least an anode, a cathode and a grid, a first and a second resistor, the anode of said amplifier being connected through said first resistor to the anode of one thyratron, to the cathode of the other thyratron and to said cathode ray tube indicator, an intermediate point on said voltage divider being connected through said second resistor to the cathode of said one thyratron, to the anode of said other thyratron, and to said cathode ray tube indicator, a capacitor across the anode and cathode of said one thyratron, and means to apply positive pulses to the grids of said thyratrons to cause conduction therethrough.

LESLIE L. BURNS, Jr.

References Cited in the file of this patent
UNITED STATES PATENTS

| Number | Name | Date |
|---|---|---|
| 1,047,157 | Bliss | Dec. 17, 1912 |
| 1,472,342 | Pickard | Oct. 30, 1923 |
| 1,996,906 | De Lanty | Apr. 9, 1935 |
| 2,252,059 | Barth | Aug. 12, 1941 |
| 2,261,309 | Stuart | Nov. 4, 1941 |
| 2,373,096 | Bonell | Apr. 10, 1945 |
| 2,387,496 | Cornelius | Oct. 23, 1945 |
| 2,407,536 | Chapman | Sept. 10, 1946 |
| 2,432,514 | Depp et al. | Dec. 16, 1947 |
| 2,466,687 | Craddock et al. | Apr. 12, 1949 |
| 2,474,693 | Rowe | June 28, 1949 |
| 2,480,265 | Rubenstein | Aug. 30, 1949 |
| 2,542,018 | Ferrill | Feb. 20, 1951 |